US010210278B2

(12) United States Patent
Sanan et al.

(10) Patent No.: US 10,210,278 B2
(45) Date of Patent: Feb. 19, 2019

(54) OPTIMIZED DIGITAL COMPONENTS

(71) Applicant: Google LLC, Mountain View, CA (US)

(72) Inventors: Shibani Sanan, Saratoga, CA (US);
Vinod Kumar Ramachandran,
Sunnyvale, CA (US); **Christopher K.
Harris, Santa Clara, CA (US); Sissie
Ling-Ie Hsiao**, Los Altos, CA (US)

(73) Assignee: Google LLC, Mountain View, CA (US)

( * ) Notice: Subject to any disclaimer, the term of this patent is extended or adjusted under 35 U.S.C. 154(b) by 95 days.

(21) Appl. No.: 15/250,247

(22) Filed: Aug. 29, 2016

(65) Prior Publication Data

US 2018/0060445 A1  Mar. 1, 2018

(51) Int. Cl.
 *G06F 17/30* (2006.01)
 *G06F 17/21* (2006.01)
 *G06Q 10/10* (2012.01)
 *G06Q 30/02* (2012.01)

(52) U.S. Cl.
 CPC ...... *G06F 17/30896* (2013.01); *G06F 17/211* (2013.01); *G06F 17/3005* (2013.01); *G06F 17/30011* (2013.01); *G06F 17/30554* (2013.01); *G06F 17/30867* (2013.01); *G06Q 10/101* (2013.01); *G06Q 30/0242* (2013.01)

(58) Field of Classification Search
 CPC ............... G06F 17/30; G06F 17/30554; G06F 17/30896
 USPC .................................................. 707/600–899
 See application file for complete search history.

(56) References Cited

U.S. PATENT DOCUMENTS

| 9,619,829 | B2* | 4/2017 | Amacker ........... G06Q 30/0625 |
| 2008/0140521 | A1 | 6/2008 | Jambunathan et al. |
| 2010/0223546 | A1 | 9/2010 | Liu |
| 2010/0250527 | A1 | 9/2010 | Gnanamani et al. |
| 2012/0041936 | A1 | 2/2012 | Yu et al. |
| 2013/0067364 | A1 | 3/2013 | Berntson et al. |
| 2013/0339333 | A1 | 12/2013 | Stekkelpak et al. |
| 2015/0026144 | A1 | 1/2015 | Wai et al. |

(Continued)

OTHER PUBLICATIONS

International Search Report and Written Opinion issued in International Application No. PCT/US2017/036057, dated Aug. 24, 2017, 14 pages.

(Continued)

*Primary Examiner* — Isaac M Woo
(74) *Attorney, Agent, or Firm* — Fish & Richardson P.C.

(57) ABSTRACT

Methods, systems, and apparatus, including computer programs encoded on a computer storage medium, for optimizing digital components. In one aspect, the system includes a digital component server that identifies a digital component to be presented in an electronic document. The system also includes a digital component distribution server that interacts with the digital component server to determine that the electronic document includes a particular item that identifies a same entity as the digital component that was identified to be presented in the electronic document. The system combines at least a portion of the digital component with content from the particular item to form an optimized digital component. The optimized digital component is integrated into the electronic document rather than presenting either of the particular item or the digital component individually.

18 Claims, 5 Drawing Sheets

(56) References Cited

U.S. PATENT DOCUMENTS

2016/0155143 A1    6/2016   Hsiao et al.

OTHER PUBLICATIONS

Extended European Search Report issued in European Application No. 17193902.8, dated Jan. 2, 2018, 8 pages.
EP Office Action issued in European Application No. 17740141.1, dated Aug. 2, 2018, 7 pages.

* cited by examiner

OPTIMIZED DIGITAL COMPONENTS

BACKGROUND

This specification relates to data processing and combining components from different sources.

The Internet facilitates the exchange of information between users across the globe. This exchange of information enables distribution of content to a variety of users. In some situations, content from multiple different providers can be integrated into a single electronic document to create a composite document. For example, a portion of the content included in the electronic document may be selected (or specified) by a publisher of the electronic document. A digital component (e.g., a different portion of content) can be provided by a third-party (e.g., an entity that is not a publisher of the electronic document), and integrated into the electronic document with the portion of content selected by the publisher. In some situations, the digital component is selected for integration with the electronic document after a user has already requested presentation of the electronic document. For example, machine executable instructions (e.g., a script) included in the electronic document can be executed by a client device when the electronic document is rendered at the client device, and the instructions can enable (e.g., program) the client device to contact one or more remote servers to obtain one or more digital components that will be integrated into the electronic document, for example at the client device.

SUMMARY

In general, one innovative aspect of the subject matter described in this specification can be embodied in systems that include a digital component server and a digital component distribution server. The digital component server identifies a digital component to be presented in an electronic document. The digital component distribution server interacts with the digital component server and performs operations including determining that the electronic document includes a particular item that identifies a same entity as the digital component that was identified to be presented in the electronic document; combining at least a portion of the digital component with content from the particular item to form an optimized digital component, wherein the combining is performed because of the determination that the particular item identifies the same entity as the digital component; integrating the optimized digital component into the electronic document rather than presenting either of the particular item or the digital component individually; and updating a user interface of a client device to present the electronic document that includes the optimized digital component rather than either of the particular item or the digital component. Other embodiments of this aspect include corresponding methods, apparatus, and computer programs, configured to perform the actions of the methods, encoded on computer storage devices. These and other embodiments can each optionally include one or more of the following features.

The digital component distribution server can perform operations further including determining, for the optimized digital component, an incremental interaction factor based on an incremental amount of interactions generated by presentations of the digital component relative to an amount of interactions generated by items other than the digital component that identify the same entity; and attributing, to the digital component, a fraction of interactions generated by the optimized digital component based on the incremental interaction factor.

The particular item can be a given search result in a set of search results that are responsive to a received query. The set of search results may have been generated for presentation in the electronic document. Determining the incremental interaction factor for the optimized digital component can include determining a baseline interaction rating for search results that identify the same entity; determining a component interaction rating for one or more digital components that identify the same entity; and determining the incremental interaction factor, including determining a ratio of the component interaction rating to the baseline interaction rating.

Attributing a fraction of interactions generated by the optimized digital component to the digital component can include determining a product of the incremental interaction factor and a measure of interactions generated by the optimized digital component.

The digital component distribution server can perform operations including interacting with a third-party analytics server to augment attribution of the interactions generated by the optimized digital component to the digital component based on the incremental interaction factor for the digital component.

Interacting with the third-party analytics server can include receiving, by the digital component distribution server and from the third-party analytics server, an inquiry message specifying a tracking identifier corresponding to installation of an application at a client device that is being attributed to the digital component; determining that the tracking identifier corresponds to an instance in which an optimized digital component rather than the digital component was presented; transmitting, to the third-party analytics server in response to the inquiry message, a response that acknowledges the tracking identifier as originating from the one or more servers and specifies that the incremental interaction factor is to be applied to interactions attributed to the tracking identifier.

The digital component distribution server can perform operations including collecting, for each application install generated by the optimized digital component, a fraction of an install value submitted for each application install attributed to the digital component, wherein the fraction is determined in accordance with the incremental interaction factor.

Particular embodiments of the subject matter described in this specification can be implemented so as to realize one or more of the following advantages. Content from different distinct units of content (e.g., provided by different servers or providers) can be combined into a single unit of content, while still attributing a proper amount of interaction to each of the distinct units of content that were combined to generate the single unit of content. For example, if a search result and a particular digital component are combined into a single unit of content, the digital component can be attributed a fractional portion of interactions that are generated by the single unit of content based on an incremental amount of interactions that the digital component generates on its own (e.g., relative to the amount of interactions that the search result generates on its own). Multiple different versions of content (e.g., optimized digital components) can be dynamically generated at run-time (e.g., after receiving a search query and identifying search results) without having to store each of the different versions, thereby enabling countless different versions of content to be made available while utilizing only a fraction of the memory that would be required to store each different version of the content. Multiple different versions of content (e.g., optimized digital components can be dynamically generated as a user browses through information (e.g., in an app store) about various applications. User confusion can be reduced by presenting only a single unit of content that includes portions of a search result (or another particular item) and a separate digital component rather than presenting two different units of content that both refer to a same entity (e.g., downloadable application), for example, because the user does not need to closely investigate two different units of content to try to determine the differences between them. The limited amount of display space available at a client device (e.g., user device) is more effectively utilized by combining two different units of content (e.g., a search result or another particular item and a separate digital component) into a single unit of content that is presented in the display space. The amount of redundant data presented by the system is reduced by combining the two different units of content in a manner that prevents the presentation of redundant content being included in the single unit of content that is generated. The fractional attribution technique can be implemented across multiple different third-party servers, such that content providers can utilize the fractional attribution technique irrespective of which third-party server is used to track interactions. The fractional attribution technique can be implemented without requiring any changes to a publisher website or digital components that are available for distribution.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
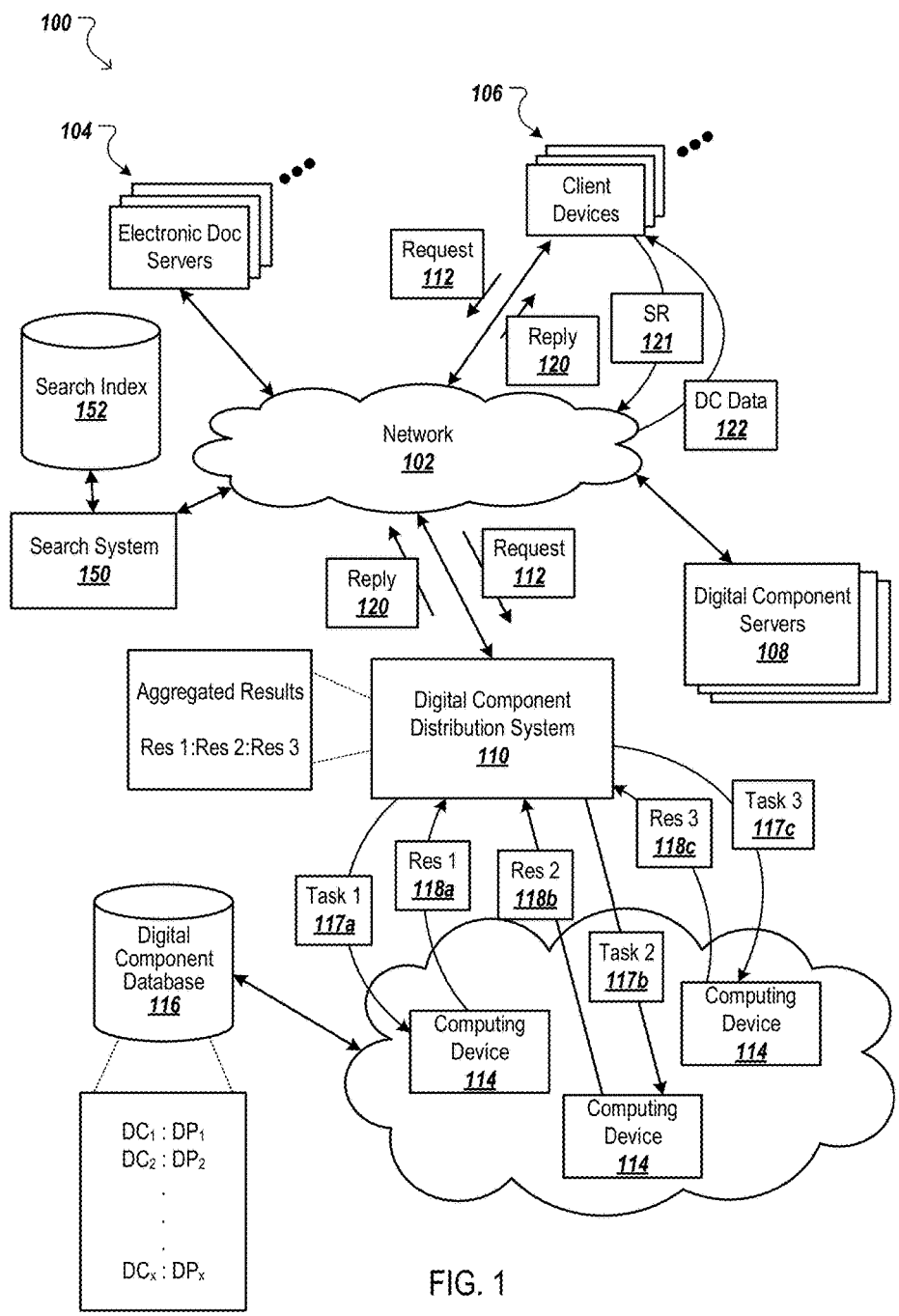
FIG. 1 is a block diagram of an example environment in which content is distributed.

This document discloses methods, systems, and devices that are used to facilitate generation and tracking of optimized digital components over a network. As discussed in more detail below, and optimized digital component can be created, for example, when the same entity (e.g., product, service, or downloadable application) is identified in both of a particular visual item (e.g., a search result that has been identified for presentation in a search results page or another visually presentable item) and a digital component that has been identified for presentation in the page. For example, assume that a search results page for the search query "App1" is being generated, and that particular search result (e.g., a highest ranked search result) identifies a downloadable application having the title "App1," and that a digital component (e.g., audio clip, video clip, image, or text in any form including the form of an advertisement) that has been selected for presentation in the search results page also identifies the downloadable application having the title "App1." In this example, instead of presenting both of the particular search result identifying App1 and the digital component identifying App1, content from the particular search result and the digital component can be combined into a single unit of content that is presented in the search results page instead of the particular search result or the digital component. This single unit of content that includes content from the particular search result and the digital component can be referred to as an optimized digital component. As discussed in more detail below, the optimized digital component can be larger than either of the digital component or the particular search result (or other particular item) used to generate the optimized digital component. Additionally, and also described in more detail below, interactions that are generated by the optimized digital component may be fractionally attributed to the digital component based on the fact that the particular search result alone would generate some baseline level of interaction even if the digital component (or a portion thereof) were not presented.

Note that the techniques described in this document can also be implemented in situations where a user browsing through available applications (e.g., in an online Application Store). For example, if the page that will be presented to the browsing user will include both a particular item that identifies App1 and a digital component that identifies App1, the particular item and the digital component can be combined to create an optimized digital component. For brevity, much of the description that follows will refer to the search results environment.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. Generally, a digital component is defined by (or provided by) a single provider or source (e.g., an advertiser, publisher, or other content provider). As discussed in more detail below, digital components from multiple different sources can be combined into a single electronic document (e.g., collection of various different digital components), and portions of various digital components from different sources can be combined into a single digital component with information extracted from search results (or other portions of content).

FIG. 1 is a block diagram of an example environment 100 in which digital components are distributed for presentation with electronic documents. The example environment 100 includes a network 102, such as a local area network (LAN), a wide area network (WAN), the Internet, or a combination thereof. The network 102 connects electronic document servers 104, client devices 106, digital component servers 108, and a digital component distribution system 110 (also referred to as a component distribution system). The example environment 100 may include many different electronic document servers 104, client devices 106, and digital component servers 108.

A client device 106 is an electronic device that is capable of requesting and receiving resources over the network 102.

Example client devices 106 include personal computers, mobile communication devices, and other devices that can send and receive data over the network 102. A client device 106 typically includes a user application, such as a web browser, to facilitate the sending and receiving of data over the network 102, but native applications executed by the client device 106 can also facilitate the sending and receiving of data over the network 102.

An electronic document is data that presents a set of content at a client device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 106 by electronic document servers 104 ("Electronic Doc Servers"). For example, the electronic document servers 104 can include servers that host publisher websites. In this example, the client device 106 can initiate a request for a given publisher webpage, and the electronic server 104 that hosts the given publisher webpage can respond to the request by sending machine executable instructions that initiate presentation of the given webpage at the client device 106.

In another example, the electronic document servers 104 can include app servers from which client devices 106 can download apps. In this example, the client device 106 can download files required to install an app at the client device 106, and then execute the downloaded app locally.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the client device 106 to request content from the data source when the given electronic document is processed (e.g., rendered or executed) by a client device 106. The client device 106 integrates the content obtained from the data source into the given electronic document to create a composite electronic document including the content obtained from the data source.

In some situations, a given electronic document can include a digital component tag or digital component script that references the digital component distribution system 110. In these situations, the digital component tag or digital component script is executed by the client device 106 when the given electronic document is processed by the client device 106. Execution of the digital component tag or digital component script configures the client device 106 to generate a request for digital components 112 (referred to as a "component request"), which is transmitted over the network 102 to the digital component distribution system 110. For example, the digital component tag or digital component script can enable the client device 106 to generate a packetized data request including a header and payload data. The component request 112 can include event data specifying features such as a name (or network location) of a server from which the digital component is being requested, a name (or network location) of the requesting device (e.g., the client device 106), and/or information that the digital component distribution system 110 can use to select one or more digital components provided in response to the request. The component request 112 is transmitted, by the client device 106, over the network 102 (e.g., a telecommunications network) to a server of the digital component distribution system 110.

The component request 112 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the digital component distribution system 110. Similarly, event data specifying keywords associated with the electronic document ("document keywords") or entities (e.g., people, places, or things) that are referenced by the electronic document can also be included in the component request 112 (e.g., as payload data) and provided to the digital component distribution system 110 to facilitate identification of digital components that are eligible for presentation with the electronic document. The event data can also include a search query that was submitted from the client device 106 to obtain a search results page, and/or data specifying search results and/or textual, audible, or other visual content that is included in the search results.

Component requests 112 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 112 can be transmitted, for example, over a packetized network, and the component requests 112 themselves can be formatted as packetized data having a header and payload data. The header can specify a destination of the packet and the payload data can include any of the information discussed above.

The component distribution system 110, which includes one or more digital component distribution servers, chooses digital components that will be presented with the given electronic document in response to receiving the component request 112 and/or using information included in the component request 112. In some implementations, a digital component is selected in less than a second to avoid errors that could be caused by delayed selection of the digital component. For example, delays in providing digital components in response to a component request 112 can result in page load errors at the client device 106 or cause portions of the electronic document to remain unpopulated even after other portions of the electronic document are presented at the client device 106. Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document is no longer presented at the client device 106 when the digital component is provided.

In some implementations, the digital component distribution system 110 is implemented in a distributed computing system that includes, for example, a server and a set of multiple computing devices 114 that are interconnected and identify and distribute digital component in response to requests 112. The set of multiple computing devices 114 operate together to identify a set of digital components that are eligible to be presented in the electronic document from among a corpus of millions of available digital components ($DC_{1-x}$). The millions of available digital components can be indexed, for example, in a digital component database 116. Each digital component index entry can reference the corresponding digital component and/or include distribution parameters ($DP_1$-$DP_x$) that contribute to (e.g., condition or limit) the distribution/transmission of the corresponding digital component. For example, the distribution parameters can contribute to the transmission of a digital component by requiring that a component request include at least one criterion that matches (e.g., either exactly or with some pre-specified level of similarity) one of the distribution parameters of the digital component.

In some implementations, the distribution parameters for a particular digital component can include distribution keywords that must be matched (e.g., by electronic documents, document keywords, or terms specified in the component request 112) in order for the digital component to be eligible for presentation. The distribution parameters can also require that the component request 112 include information specifying a particular geographic region (e.g., country or state) and/or information specifying that the component request 112 originated at a particular type of client device (e.g., mobile device or tablet device) in order for the digital component to be eligible for presentation. The distribution parameters can also specify an eligibility value (e.g., ranking score or some other specified value) that is used for evaluating the eligibility of the digital component for distribution/transmission (e.g., among other available digital components), as discussed in more detail below. In some situations, the eligibility value can specify an amount that will be submitted when a specific event is attributed to the digital component (e.g., when an application is installed at a client device through interaction with the digital component or otherwise attributable to presentation of the digital component).

The identification of the eligible digital component can be segmented into multiple tasks 117a-117c that are then assigned among computing devices within the set of multiple computing devices 114. For example, different computing devices in the set 114 can each analyze a different portion of the digital component database 116 to identify various digital components having distribution parameters that match information included in the component request 112. In some implementations, each given computing device in the set 114 can analyze a different data dimension (or set of dimensions) and pass (e.g., transmit) results (Res 1-Res 3) 118a-118c of the analysis back to the digital component distribution system 110. For example, the results 118a-118c provided by each of the computing devices in the set 114 may identify a subset of digital components that are eligible for distribution in response to the component request and/or a subset of the digital component that have certain distribution parameters. The identification of the subset of digital components can include, for example, comparing the event data to the distribution parameters, and identifying the subset of digital components having distribution parameters that match at least some features of the event data.

The digital component distribution system 110 aggregates the results 118a-118c received from the set of multiple computing devices 114 and uses information associated with the aggregated results to select one or more digital components that will be provided in response to the request 112. For example, the digital component distribution system 110 can select a set of winning digital components (one or more digital components) based on the outcome of one or more component evaluation processes, as discussed below. In turn, the digital component distribution system 110 can generate and transmit, over the network 102, reply data 120 (e.g., digital data representing a reply) that enable the client device 106 to integrate the set of winning digital components into the given electronic document, such that the set of winning digital components and the content of the electronic document are presented together at a display of the client device 106.

In some implementations, the client device 106 executes instructions included in the reply data 120, which configures and enables the client device 106 to obtain the set of winning digital component from one or more digital component servers. For example, the instructions in the reply data 120 can include a network location (e.g., a Uniform Resource Locator (URL)) and a script that causes the client device 106 to transmit a server request (SR) 121 to the digital component server 108 to obtain a given winning digital component from the digital component server 108. In response to the request, the digital component server 108 will identify the given winning digital component specified in the server request 121 (e.g., within a database storing multiple digital components) and transmit, to the client device 106, digital component data (DC Data) 122 that presents the given winning digital component in the electronic document at the client device 106.

To facilitate searching of electronic documents, the environment 100 can include a search system 150 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 152 (e.g., hardware memory device(s)). Data that are associated with an electronic document is data that represents content included in the electronic document and/or metadata for the electronic document.

Client devices 106 can submit search queries to the search system 150 over the network 102. In response, the search system 150 accesses the search index 152 to identify electronic documents that are relevant to the search query. The search system 150 identifies the electronic documents in the form of search results and returns the search results to the client device 106 in search results page. A search result is data generated by the search system 150 that identifies an electronic document that is responsive (e.g., relevant) to a particular search query, and includes an active link (e.g., hypertext link) that causes a client device to request data from a specified location in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the client device 106. In some situations, the search engine can be part of, or interact with, an application store (or an online portal) from which applications can be downloaded for install at a client device 106 in order to present information about downloadable applications that are relevant to a submitted search query. Like other electronic documents search results pages can include one or more slots in which digital components (e.g., advertisements, video clips, audio clips, images, or other digital components) can be presented.

In some situations, a digital component that is selected to be presented in an electronic document may refer to a same entity as one or more of the search results that are included in the electronic document. For example, assume that the electronic document is a search results page being provided in response to the search query "App1." In this example, the search results for the search query "App1" may include a search result that identifies an application titled App1 and/or enables a user to download the application titled App1 from an application store. Further assume, for purposes of example, that the digital component distribution system 110 selected a digital component that includes information about the application App1, and that the digital component includes a control that enables the user to download the application titled App1 from the application store. In this situation, the electronic document will include two different items (e.g., a search result and a separate digital component) that both refer to the same entity (e.g., the downloadable application App1), and both enable a user to download the application App1 from the application store. As such, the electronic document includes redundant information, which can result in inefficient use of a limited amount of display space and may cause user confusion as to which of the items the user should interact with to download the application.

As discussed in more detail below, the digital component distribution system 110 can improve the utilization of the limited display space and reduce confusion among users by taking various actions when a search result and a digital component that is being presented with the search result both identify (or refer to) a same entity. For example, in some situations, content from the search query and the digital component can be combined into a single content unit (e.g., an optimized digital component), which will be presented in the search results page instead of either of the search query or the digital component.

The digital component distribution system 110 can also attribute a fractional portion of interactions generated by an optimized digital component to the digital component that was used to generate the optimized general component, as discussed in more detail with reference to FIG. 3. This prevents the amount of interactions attributed to the digital component from being overstated when the digital component is not the sole source of the interactions, thereby improving the accuracy with which a computer system tracks and attributes interactions to the different portions of content used to generate the optimized digital component. Further, as discussed below with reference to FIGS. 3 and 4, the digital component distribution system 110 can be configured to enable third-party servers to accurately attribute interactions to the digital component when interactions are generated by the optimized digital component, but the third-party servers are unaware of the fact that the optimized digital component is a combination of content from multiple different sources (e.g., a search result and digital component provided by a different provider than the search results). More specifically, the techniques discussed below enable the servers/computing devices responsible for attributing interactions to digital components to more accurately record and track attribution in situations where the optimized digital component is used instead of the digital component, but the use of the optimized digital component is initiated by a separate server/system.

Figure 2:
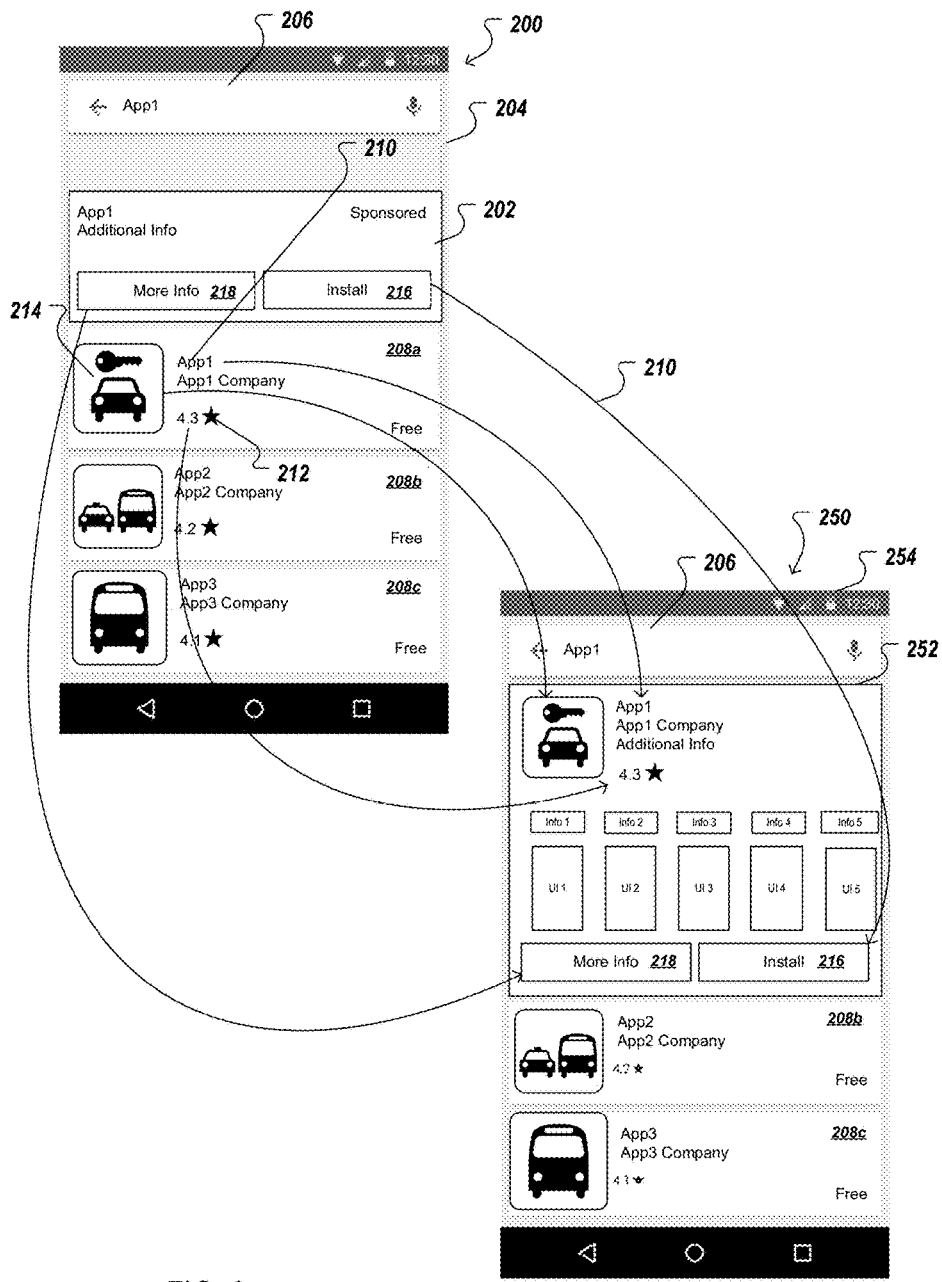
FIG. 2 is an illustration of example user interfaces that include an example digital component and an example optimized digital component.

FIG. 2 is an illustration of example user interfaces 200 and 250 that respectively include an example digital component 202 and an example optimized digital component 252. The example digital component 202 is shown presented in a user interface 204 of a mobile device (e.g., a smartphone), and the example optimized digital component 252 is also presented in a user interface 254 of a mobile device. The user interfaces of the mobile devices are provided for example purposes only, as the techniques and features discussed below can be implemented in various different user interfaces presented in various different types of devices.

As shown in FIG. 2, the user interface 204 and the user interface 254 are each being presented in response to submission of a search query "App1" that has been submitted through a search submission control 206 that is presented in each of the user interfaces. More specifically, the user interface 204 is presenting the digital component 202 that was selected for presentation, for example, by the digital component distribution system 110. The user interface 204 also is also presenting three search results 208a, 208b, and 208c that were selected by a different system, such as the search system 150. Meanwhile, the user interface 254 is presenting the search results 208b and 208c, but is not presenting the search result 208a. Rather, the user interface 254 is presenting the optimized digital component 252 instead of either of the digital component 202 or search result 208a that are presented in the user interface 204.

The optimized digital component 252 can be created, for example, by merging (e.g., combining) content from each of two separate units of content (e.g., the digital component 202 and the search result 208a) into a single unit of content or content unit (e.g., the optimized digital component 252). As discussed above, and in more detail below, the digital component 202 and the search result 208a can be combined to form the optimized digital component 252, for example, when it is determined that the digital component 202 and the search result 208a both identify (or refer to) a same entity and that both of the digital component 202 and the search result 208a will be presented together in a same search results page (or another electronic document). In this example, the digital component 202 and the search result 208a both identify App1 (e.g., the title of the application) in their respective textual content. As such, these two units of content each identify the same entity (i.e., the application App1). Thus, when both of the digital component 202 and the search result 208a (or another search result that identifies App1) are selected for presentation in the same search results page, the optimized digital component 252 an be created (e.g., by the digital component distribution system 110) and presented in the search results page instead of presenting the digital component 202 and the search result 208a in the search results page.

As shown in FIG. 2, the optimized digital component 252 is larger than either of the digital component 202 or the search result 208a. More specifically, in this example, the vertical height of the optimized digital component 252 is taller than the vertical height of either of the digital component 202 or the search result 208a, but the size increase could be due to an increased width instead of, or in addition to, the increased vertical height. As such, the optimized digital component 252 occupies more of the display than either of the digital component 202 or the search result 208a.

In some implementations, various portions of content can be extracted from the search result 208a and inserted into the optimized digital component 252 along with content from the digital component 202. For example, as shown in FIG. 2, textual information 210, rating information 212, and an icon 214 can be extracted from the search result 208a, and inserted into the optimized digital component 252 along with an install control 216 and a more info control 218 from the digital component 202, as indicated by the arrows. The optimized digital component 252 can also include other information (e.g., Info 1-Info 5) and/or screen shots (e.g., UI 1-UI 5) that can be obtained from one or more other sources of information about the same entity (e.g., data stores that store information about App1, an application store from which the application is downloadable, or another source of information such as third-party reviews).

The portions of content are aggregated into the single unit of content (e.g., that is visually distinct from other units of content presented in the user interface), and presented in the user interface 254, such that the user interface 254 only includes one unit of content that identifies the same entity (e.g., App1), rather than having multiple different units of content that each refer to the same entity (e.g., the same downloadable application). This reduces confusion that may arise when two different units of content are identifying the same entity, and also provides an enhanced visualization of relevance when both of the digital component 202 and the search result 208a are selected for presentation in response to the submitted query. More specifically, the increased size of the optimized digital component 252 and the additional information provided by the optimized digital component 252 provides an indication that the entity (e.g., downloadable application) identified in the optimized digital component is more relevant to the submitted query than other entities that may be identified in the search results 208b and 208c or other digital components that may be presented in the user interface 254.

Figure 3:
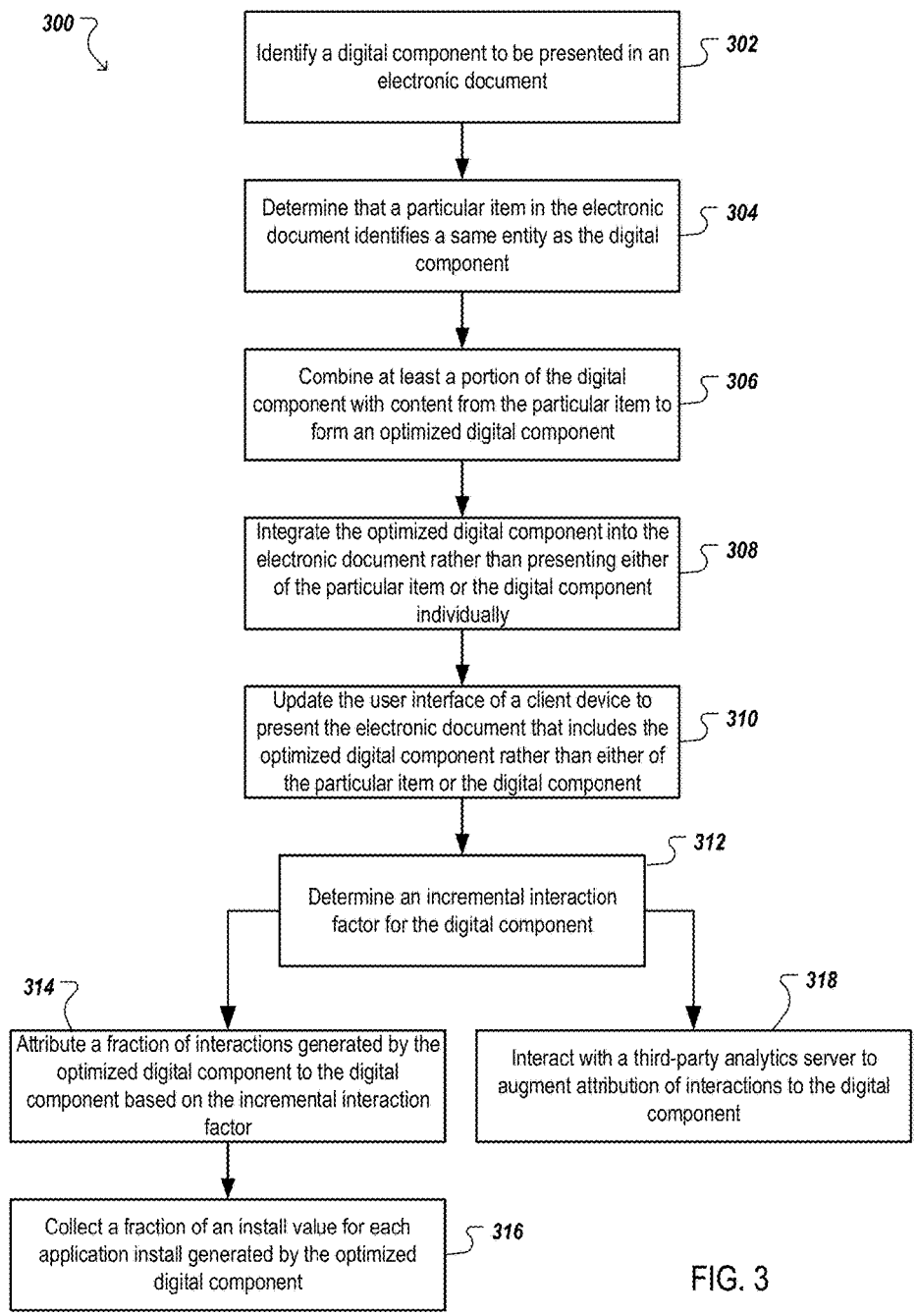
FIG. 3 is a flow chart of an example process for combining multiple components into a single unit of content.

FIG. 3 is a flow chart of an example process 300 for combining multiple components into a single unit of content. The single unit of content can be referred to as an optimized digital component. The optimized digital component can include portions of content from a given digital component and a given search result. In some implementations, the optimized digital component is created to replace both of the given digital component and the given search result when both of the given digital component and the given search result have both been selected for presentation in a same electronic document. The process 300 can be performed by one or more servers or other computing devices. For example, operations of the process 300 can be performed by digital component distribution system 110 of FIG. 1. Operations of the process 300 can also be implemented as instructions stored on a non-transitory computer readable medium, and when the instructions are executed by one or more servers (or other computing devices), the instructions cause the one or more servers to perform operations of the process 300.

A digital component to be presented in an electronic document with an electronic document is identified (302). The electronic document can be, for example, a search results page being presented responsive to a received query, a particular page of an online application store, or another electronic document. In some implementations, one or more servers that identified the digital component previously received a search query and use the search query to identify search results that are responsive to the search query. For example, the one or more servers can include a search system (e.g., a search engine) that receives the search query from a client device and identifies search results that are deemed relevant to the search query by the search engine.

The digital component can be identified, for example, by one or more servers (or other computing devices), such as the digital component distribution system 110 of FIG. 1. The digital component can be identified using event data that are received with a request for a digital component. For purposes of example, assume that the received search query is identified as "App1" in a set of event data, and that the search results identified as responsive to the search query include the search results 208a, 208b, and 208c of FIG. 2. Further assume that the digital component identified to be presented with the search results 208a, 208b, and 208c is the digital component 202 of FIG. 2. As discussed above, the digital component 202 can be identified for presentation in a search results page, for example, based on a distribution keyword for the digital component 202 matching the search query "App1." More specifically, the digital component distribution system 110 can compare the search query "App1" to the distribution keywords for the digital component 202 and determine that a match exists based on a similarity (e.g., an exact match or a near match) between the search query and the distribution keywords.

In another example, assume that a user is browsing pages of an online application store (or another web site), and that the user has interacted with a link that causes presentation of visual items that identify various downloadable applications. For example, assume that the user has clicked on a "strategy games" link that causes presentation of a page that includes a list of items that identify different strategy games that are available for download. In this example, if App1 is a "strategy game," the page may include a particular item (e.g., visual portion of content) that identifies App1 as an application that is related to the strategy game category and is available for download. Further, the phrase "strategy game" may be used to identify a digital component to be presented on the page with the list of items.

A determination is made that the electronic document includes a particular item (e.g., a given search result or other visual portion of content) that identifies a same entity as the digital component that was identified to be presented in the electronic document (304). In some implementations, the determination that the particular item identifies a same entity as the digital component can be performed based on an analysis of the content of the digital component and the particular item (e.g., the given search result or other visual portion of content). For example, content of a given search result (or other visual portion of content) can be parsed to identify various phrases (e.g. one or more words), images, or other attributes that are included in the given search result. The content of the digital component can be similarly parsed to identify various phrases, images, or other attributes that are included in the digital component. The parsed attributes of the given search result (or other visual portion of content) and the digital component can be compared, for example, to determine whether a same entity is identified or referenced by each of the given search result (or other visual portion of content) and the digital component. For example, if the title of "App1" for the downloadable application "App1" is included in the parsed attributes of the given search result and the parsed attributes of the digital component, the given search result and the digital component can be determined to identify the same entity (e.g., the downloadable application titled App1).

At least a portion of the digital component is combined with content from the particular item (e.g., given search result or other visual portion of content in the electronic document) to form an optimized digital component (306). The optimized digital component can be larger than either of the particular item (e.g., the given search result) or the digital component individually. For example, an amount of display area occupied by the optimized digital component can be greater than the amount of display area occupied by the given search result or the amount of display area occupied by the digital component. In some implementations, the portion of the digital component and the content from the given search result are combined because of (e.g., in response to) the determination that the given search result identifies the same entity as the digital component. The combining of the portion of the digital component and the content from the given search result can also be conditioned on the determination that both of the digital component and the given search result will be presented in a same electronic document. For example, the digital component and the content from the given search result may only be combined when both of the digital component and the given search result have been selected for presentation in a same search results page. In some implementations, the generation of the optimized digital component can be conditioned on the given search result (or other portions of visual content) and the digital component being selected for presentation immediately adjacent to each other in the display (e.g., without any other search results, items, or digital components being presented between the given search result and the digital component).

The content from the particular item (e.g., given search result) can be combined with the digital component in various different ways. For example, the combination of the given search result with the digital component can be based on a template that specifies which portion of a search result will be extracted from the search result and inserted into the digital component. The template can also specify types of content (e.g., text, images, video, audio, or other types of content) that are eligible for being inserted into (or combined with content from) the digital component, where specific types of content will be located in the optimized digital component, as well as formatting or other details regarding how the combination of the content from the given search result and the digital component will be presented together in a single unit of content.

The optimized digital component is integrated into the electronic document rather than presenting either of the given search result or the digital component individually (308). In some implementations, the optimized digital component can be integrated into the electronic document such that the optimized digital component is presented in a display area of the electronic document at which the given search result and the digital component would have been presented. For example, FIG. 2 shows the optimized digital component 252 being presented at a display location where the digital component 202 and the search result 208a are presented in the user interface 204. As illustrated, the optimized digital component 252 replaces both of the digital component 202 and the search result 208a, such that the optimized digital component 252 is presented instead of either of the digital component 202 or the search result 208a.

The user interface of a client device is updated to present the electronic document that includes the optimized digital component rather than either of the given search result or the digital component (310). In some implementations, the user interface of the client device is updated by transmitting, over a network, data that caused the client device to present the optimized digital component in the electronic document.

An incremental interaction factor is determined for the optimized digital component (312). The incremental interaction factor is a numerical value that is used to attribute a portion of interactions generated by the optimized digital component to the digital component when the optimized digital component is presented instead of the digital component. For example, the incremental interaction factor can represent an incremental amount of interactions that are generated by the digital component relative to the amount of interactions generated by search results that identify the same entity as the digital component.

In some implementations, the incremental interaction factor for the optimized digital component is determined using a baseline interaction rating for search results that identify the same entity and a component interaction rating for one or more digital components that identify the same entity. The baseline interaction rating for search results is a measure of interactions (e.g., application downloads, conversions, or in-app activity or revenue) that are attributable to the search results independent of the presentation of digital components (e.g., advertisements). The baseline interaction rating for search results (or other portions of visual content) that identify the same entity can be determined, for example, based on interactions that are generated by search results (or other portions of visual content) that are presented without a digital component that identifies the same entity. For example, assume that the search results 208a-208c in FIG. 2 were presented without the digital component 202 at various different times. In this example, interactions (e.g., downloads of App1) attributable to the presentation of the search result 208a could be used to determine the baseline interaction rating for the search results that identify App1. For example, a download rate (e.g., number of downloads of App1/presentations of search results that identify App1) associated with presentations of the search results that identify App1 without a digital component could be determined for the search results, and this download rate could be used as the baseline interaction rating for the search results that identify App1. Other interaction measures (e.g., click rates, conversion rates, or specified in-app activity) could also be used to determine the baseline interaction rating for the search results that identify App1 in this example.

The component interaction rating for digital components that identify the same entity (e.g., a particular entity) is a measure of interactions that are attributable to presentations of the digital components that identify that same entity. The component interaction rating for digital components can be determined, for example, based on interactions that are generated when one of the digital components is presented in electronic document. In some implementations, interactions performed by users that were presented an electronic document that included the digital component 202 of FIG. 2, can be used to determine the component interaction rating. For example, a download rate for App1 that is associated with presentations of the digital component 202 can be determined and used as the component interaction rating for the digital component 202.

Once the baseline interaction rating and the component interaction rating have been determined, the incremental interaction factor can be determined using these ratings. For example, a ratio of the component interaction rating relative to the baseline interaction rating can be computed, and the results can be used as the incremental interaction factor for interactions generated by the optimized digital component. For purposes of example, assume that presentations of digital components identifying App1 are associated with 10% more installs of App1 than presentations of search results identifying App1 that did not include presentation of a digital component identifying App1. In this example, the incremental interaction factor for digital components identifying App1 may be set to 0.1, indicating that presentations of digital components identifying App1 provide an incremental installation rate of 10% relative to presentations of search results identifying App1.

There are also other ways of determining the incremental interaction factor. For example, the interaction rate (e.g., install rate) for a particular application that is identified by a digital component can be compared to an interaction rate for a different application that is not identified in digital components (e.g., an application that is not being advertised in search results pages). In this example, the different application can be selected based on its similarity to the particular application. For example, if the particular application is a ride sharing application, the different application may be a different ride sharing application or a taxi service application. The incremental interaction factor can be determined, for example, based on a ratio of the interaction rate for the particular application relative to the interaction rate for the different application. Alternatively, an aggregate (e.g., average) interaction rate can be determined for multiple different applications that are in a same category of applications (e.g., ride sharing or transportation applications) as the particular application, and the incremental interaction factor can be determined as a ratio of the interaction rate for the particular application relative to the aggregate interaction rate for the multiple different applications that are in the same category as the particular application.

In another example, the incremental interaction factor can be determined by comparing an interaction rate for a particular application in a geographic region where the digital component identifying the particular application is being distributed relative to an interaction rate for the particular application in a different geographic region where the digital component is not being distributed. For example, assume that digital components (e.g., advertisements or other designated types of content) identifying App1 are being distributed in the United States, but not being distributed in Canada. In this example, the incremental interaction factor can be determined based on a ratio of the interaction rate in the United States relative to the interaction rate in Canada.

A fraction of interactions generated by the optimized digital component are attributed to the digital component based on the incremental interaction factor (314). In some implementations, the fraction of interactions generated by the optimized digital component can be attributed to the digital component by determining a product of the incremental interaction factor and a measure of interactions generated by the optimized digital component. For example, a number of application downloads, specified in-app activity (e.g., first use, game level completion, or in-app revenue), or other measures of interaction with the application (e.g., App1) can be scaled by multiplying the incremental interaction factor with the number of application downloads, specified in-app activity, or other measures of interaction with the application. The resulting value will be the fraction of interactions generated by the optimized digital component that are attributed to the digital component.

The attribution of the fraction of interactions generated by the optimized digital component enables the digital component to still receive credit for its contribution to generating the interactions even when content of a search result is combined with the digital component. Continuing with the example above and assuming that the incremental interaction factor is 0.1, the digital component 202 will be attributed 10% of the interactions generated by the optimized digital component. This fractional attribution accounts for the fact that presentation of the search results identifying App1 will generate some level of interaction, but credits the digital component the 10% incremental interactions that were determined to be generated by the digital component beyond the level of interaction generated by the search results.

A fraction of an install value is collected for each application install generated by the optimized digital component (316). In some implementations, the fraction collected is determined in accordance with the incremental interaction factor. For example, the incremental interaction factor can be multiplied by the install value to arrive at the fraction of the install value that is collected. The install value can be, for example, an amount that the application developer is willing to submit (e.g., pay) for each install of the application (or specified interaction with the application).

A third-party analytics server is interacted with to augment attribution of interactions to the digital component (318). In some implementations, the attribution of interactions to the digital component are augmented based on the incremental interaction factor for the digital component when the interactions are generated by the optimized digital component. For example, as discussed above, the digital component can be attributed a fraction of the interactions that are generated by the optimized digital component by determining a product of the interactions and the incremental interaction factor. However, when third-party analytics servers (e.g., operating independently of the digital component distribution system 110) are responsible for attributing interactions to the digital component these third-party analytics servers generally do not have information specifying whether the optimized digital component was presented or the digital component was presented, or that a fractional portion of the interactions, rather than all of the interactions, are to be attributed to the digital component when the optimized digital component is presented. Therefore, the third-party analytics servers must be transmitted information that enables (e.g., configures) the third-party analytics servers to appropriately attribute a fractional portion of the interactions to the digital component when the optimized digital component is presented rather than the digital component.

In some implementations, one or more servers (e.g., the digital component distribution system 110) receive an inquiry message from the third-party analytics server. The inquiry message specifies a tracking identifier corresponding to installation of an application at a client device that is being attributed to the digital component. The tracking identifier may be, for example, a unique identifier (e.g., component ID) that is assigned to each presentation of the digital component or optimized digital component. As such, the tracking identifier can be used by the one or more servers to determine whether or the optimized digital component or the digital component generated (or led to) this particular installation of the application (or other interaction with the application). For example, the one or more servers can compare the tracking identifier to a list of tracking identifiers that were assigned to various presentations of the digital component and the optimized digital component to identify which presentation was assigned that specific tracking identifier.

When the tracking identifier is identified within the list of tracking identifiers, the one or more servers can make the determination that the tracking identifier corresponds to an instance in which the one more servers distributed the optimized digital component instead of the digital component (e.g., when the tacking identifier is associated with the optimized digital component). For example, the instance of the tracking identifier within the list of the identifiers can include information specifying that the optimized digital component is assigned this particular tracking identifier.

When the determination is made that the tracking identifier corresponds to an instance in which the optimized digital component was presented rather than the digital component, the one more servers can transmit a response to the inquiry message to the third-party analytics server. The response can acknowledge that the tracking identifier originated from the one or more servers (e.g., indicating that the one or more servers in fact distributed content corresponding to the tracking identifier). Additionally, the response can specify that the incremental interaction factor is to be applied to interactions that attributed to the tracking identifier, thereby attributing a fraction of the interactions to the presentation of the optimized digital component. In turn, the third-party analytics server can store the incremental interaction factor, and apply the incremental interaction factor to any interactions (e.g., the initial application install, as well as future interactions, such as in-app activity) that are attributed to the tracking identifier for the optimized digital component. As such, the response to the inquiry message configures the third-party analytics server to implement the fractional attribution being applied by the digital component distribution system without requiring the third-party analytics server to have information about the use of the optimized digital component.

Figure 4:
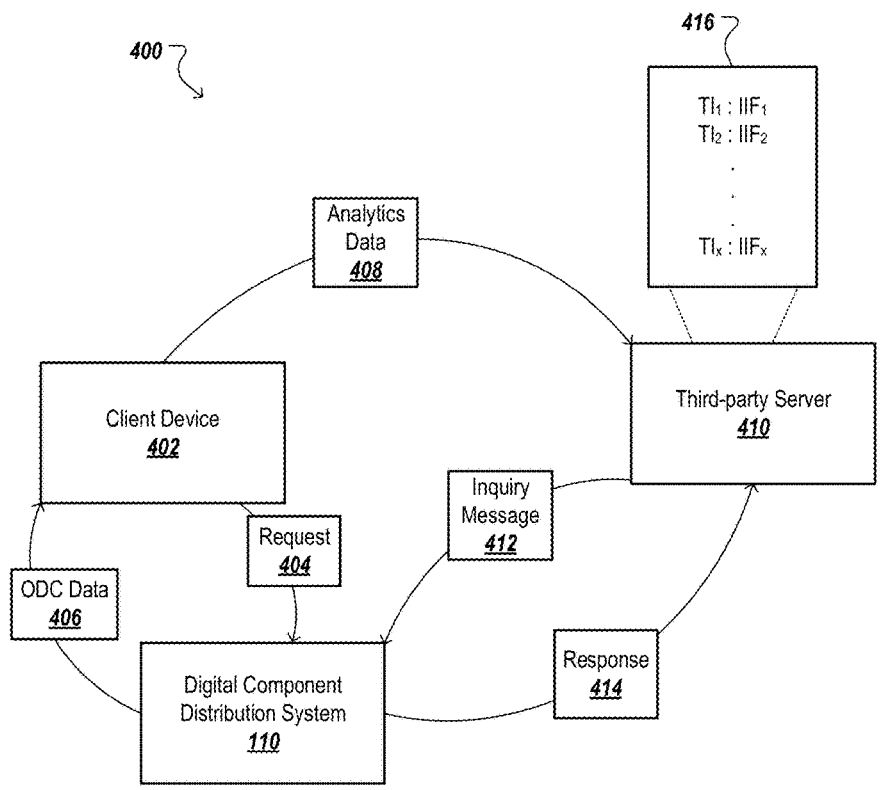
FIG. 4 is a block diagram illustrating example communications with a third-party server.

FIG. 4 is a block diagram illustrating example communications with a third-party server. As shown in FIG. 4 a client device 402 can submit a request for content 404 to the digital component distribution system 110. Note that the request can also be generated by a server or another computing device that is part of a search system. The request 404 can be a request for a digital component to be incorporated into an electronic document. In response to the request, the digital component distribution system 110 can transmit optimized digital component data 406 to the client device. The optimized digital component data 406 can include, for example, an optimized digital component and a tracking identifier uniquely identifying the specific presentation of the optimized digital component at the client device 402.

When an interaction is generated by the optimized digital component at the client device 402, a script included in the electronic document causes the client device 402 to transmit analytics data 408 to a third-party server 410 (e.g., a third-party analytics server). The analytics data 408 can include, for example, information identifying the interaction (e.g., a download of a particular application, a first use of the particular application, or other in-app activities performed within the particular application), and can also include the tracking identifier that was assigned to the optimized digital component by the digital component distribution system 110.

In response to receiving the analytics data, the third-party server 410 can transmit an inquiry message 412 to the digital component distribution system 110 and/or other digital component distribution systems (e.g., operated by other digital component distributors). The inquiry message 412 can include the tracking identifier obtained from the analytics data 408, so that the digital component distribution system can determine whether the analytics data corresponds to a digital component that was provided by the digital component distribution system 110.

When the digital component distribution system 110 identifies the tracking identifier as one that was included in the optimized digital component data 406, the digital component distribution system 110 can transmit a response 414 to the third-party server 410. As discussed above, the response 414 can specify that the digital component distribution system 110 did provide content corresponding to the tracking identifier provided in the inquiry message 412. Additionally, the response 414 can include the incremental interaction factor that is used to attribute a fraction of interactions generated by the optimized digital component with its corresponding digital component (e.g., the digital component that was modified to obtain the optimized digital component). The third-party server 410 can store the incremental interaction factor in an index of tracking information 416, and associate the incremental interaction factor with the tracking identifier that was received in the analytics data 408. The tracking information 416 can store associations between tracking identifiers (e.g., $TI_1$-$TI_x$) with their corresponding incremental interaction factors (e.g., $IIF_1$-$IIF_x$). For example, each incremental interaction factor can be indexed to the tracking identifier for which the incremental interaction factor was provided. When interaction information (e.g., additional analytics data) for one of the tracking identifiers is received by the third-party server 410, a fractional portion of the interaction information can be attributed to the interaction information based on the incremental interaction factor that is indexed to the tracking identifier, as discussed above.

Figure 5:
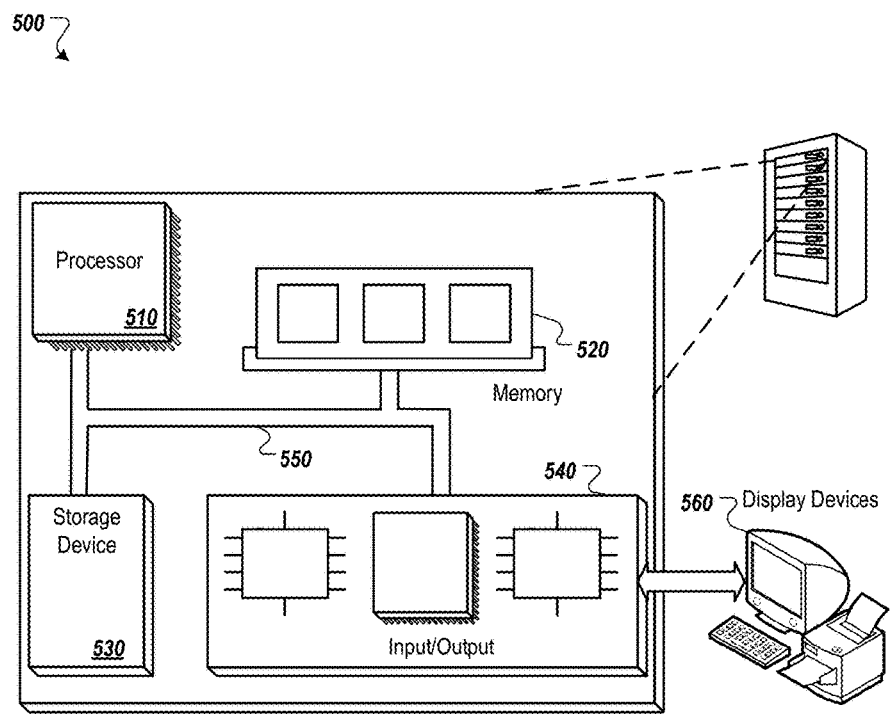
FIG. 5 is a block diagram of an example computing device.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document may, but need not, correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for generating optimized digital components, comprising:
    a digital component server that identifies a digital component to be presented in an electronic document;
    a digital component distribution server that interacts with the digital component server to perform operations including:
        determining that the electronic document includes a particular item that identifies a same entity as the digital component that was identified to be presented in the electronic document;
        combining at least a portion of the digital component with content from the particular item to form an optimized digital component, wherein the combining is performed because of the determination that the particular item identifies the same entity as the digital component;
        integrating the optimized digital component into the electronic document rather than presenting either of the particular item or the digital component individually; and
        updating a user interface of a client device to present the electronic document that includes the optimized digital component rather than either of the particular item or the digital component;
        determining, for the optimized digital component, an incremental interaction factor based on an incremental amount of interactions generated by presentations of the digital component relative to an amount of interactions generated by items other than the digital component that identify the same entity; and
        attributing, to the digital component, a fraction of interactions generated by the optimized digital component based on the incremental interaction factor.

2. The system of claim 1, wherein:
    the particular item is a given search result in a set of search results that are responsive to a received query, wherein the set of search results have been generated for presentation in the electronic document; and
    determining the incremental interaction factor for the optimized digital component comprises:
        determining a baseline interaction rating for search results that identify the same entity;
        determining a component interaction rating for one or more digital components that identify the same entity; and
        determining the incremental interaction factor, including determining a ratio of the component interaction rating to the baseline interaction rating.

3. The system of claim 1, wherein attributing a fraction of interactions generated by the optimized digital component to the digital component comprises determining a product of the incremental interaction factor and a measure of interactions generated by the optimized digital component.

4. The system of claim 1, wherein the digital component distribution server performs operations further comprising interacting with a third-party analytics server to augment attribution of the interactions generated by the optimized digital component to the digital component based on the incremental interaction factor for the digital component.

5. The system of claim 4, wherein interacting with the third-party analytics server comprises:
    receiving, by the digital component distribution server and from the third-party analytics server, an inquiry message specifying a tracking identifier corresponding to installation of an application at a client device that is being attributed to the digital component;

determining that the tracking identifier corresponds to an instance in which an optimized digital component rather than the digital component was presented;

transmitting, to the third-party analytics server in response to the inquiry message, a response that acknowledges the tracking identifier as originating from the one or more servers and specifies that the incremental interaction factor is to be applied to interactions attributed to the tracking identifier.

6. The system of claim 1, wherein the digital component distribution server performs operations further comprising collecting, for each application install generated by the optimized digital component, a fraction of an install value submitted for each application install attributed to the digital component, wherein the fraction is determined in accordance with the incremental interaction factor.

7. A method for optimizing digital components performed by one or more servers, the method comprising:
  identifying a digital component to be presented in an electronic document;
  determining, by the one or more servers, that the electronic document includes a particular item that identifies a same entity as the digital component that was identified to be presented in the electronic document;
  combining, by the one or more servers, at least a portion of the digital component with content from the particular item to form an optimized digital component, wherein the combining is performed because of the determination that the particular item identifies the same entity as the digital component; and
  integrating, by the one or more servers, the optimized digital component into the electronic document rather than presenting either of the particular item or the digital component individually; and
  updating, by the one or more servers, a user interface of a client device to present the electronic document that includes the optimized digital component rather than either of the particular item or the digital component;
  determining, for the optimized digital component, an incremental interaction factor based on an incremental amount of interactions generated by presentations of the digital component relative to an amount of interactions generated by items other than the digital component that identify the same entity; and
  attributing, to the digital component, a fraction of interactions generated by the optimized digital component based on the incremental interaction factor.

8. The method of claim 7, wherein:
  the particular item is a given search result in a set of search results that are responsive to a received query, wherein the set of search results have been generated for presentation in the electronic document; and
  determining the incremental interaction factor for the optimized digital component comprises:
    determining a baseline interaction rating for search results that identify the same entity;
    determining a component interaction rating for one or more digital components that identify the same entity; and
    determining the incremental interaction factor, including determining a ratio of the component interaction rating to the baseline interaction rating.

9. The method of claim 7, wherein attributing a fraction of interactions generated by the optimized digital component to the digital component comprises determining a product of the incremental interaction factor and a measure of interactions generated by the optimized digital component.

10. The method of claim 7, further comprising interacting with a third-party analytics server to augment attribution of the interactions generated by the optimized digital component to the digital component based on the incremental interaction factor for the digital component.

11. The method of claim 10, wherein interacting with the third-party analytics server comprises:
  receiving, by the one or more servers and from the third-party analytics server, an inquiry message specifying a tracking identifier corresponding to installation of an application at a client device that is being attributed to the digital component;
  determining that the tracking identifier corresponds to an instance in which an optimized digital component rather than the digital component was presented;
  transmitting, to the third-party analytics server in response to the inquiry message, a response that acknowledges the tracking identifier as originating from the one or more servers and specifies that the incremental interaction factor is to be applied to interactions attributed to the tracking identifier.

12. The method of claim 7, further comprising collecting, for each application install generated by the optimized digital component, a fraction of an install value submitted for each application install attributed to the digital component, wherein the fraction is determined in accordance with the incremental interaction factor.

13. A non-transitory computer storage medium encoded with a computer program, the program comprising instructions that when executed by data processing apparatus cause the data processing apparatus to perform operations comprising:
  identifying a digital component to be presented in an electronic document;
  determining that the electronic document includes a particular item that identifies a same entity as the digital component that was identified to be presented in the electronic document;
  combining at least a portion of the digital component with content from the particular item to form an optimized digital component, wherein the combining is performed because of the determination that the particular item identifies the same entity as the digital component; and
  integrating the optimized digital component into the electronic document rather than presenting either of the particular item or the digital component individually; and
  updating a user interface of a client device to present the electronic document that includes the optimized digital component rather than either of the particular item or the digital component;
  determining, for the optimized digital component, an incremental interaction factor based on an incremental amount of interactions generated by presentations of the digital component relative to an amount of interactions generated by items other than the digital component that identify the same entity; and
  attributing, to the digital component, a fraction of interactions generated by the optimized digital component based on the incremental interaction factor.

14. The computer storage medium of claim 13, wherein:
  the particular item is a given search result in a set of search results that are responsive to a received query, wherein the set of search results have been generated for presentation in the electronic document; and determining the incremental interaction factor for the optimized digital component comprises:
  determining a baseline interaction rating for search results that identify the same entity;
  determining a component interaction rating for one or more digital components that identify the same entity; and
  determining the incremental interaction factor, including determining a ratio of the component interaction rating to the baseline interaction rating.

15. The computer storage medium of claim 13, wherein attributing a fraction of interactions generated by the optimized digital component to the digital component comprises determining a product of the incremental interaction factor and a measure of interactions generated by the optimized digital component.

16. The computer storage medium of claim 13, further comprising interacting with a third-party analytics server to augment attribution of the interactions generated by the optimized digital component to the digital component based on the incremental interaction factor for the digital component.

17. The computer storage medium of claim 16, wherein interacting with the third-party analytics server comprises:
  receiving, by the data processing apparatus and from the third-party analytics server, an inquiry message specifying a tracking identifier corresponding to installation of an application at a client device that is being attributed to the digital component;
  determining that the tracking identifier corresponds to an instance in which an optimized digital component rather than the digital component was presented;
  transmitting, to the third-party analytics server in response to the inquiry message, a response that acknowledges the tracking identifier as originating from the one or more servers and specifies that the incremental interaction factor is to be applied to interactions attributed to the tracking identifier.

18. The computer storage medium of claim 13, wherein the instructions cause the data processing apparatus to perform operations comprising collecting, for each application install generated by the optimized digital component, a fraction of an install value submitted for each application install attributed to the digital component, wherein the fraction is determined in accordance with the incremental interaction factor.

* * * * *

UNITED STATES PATENT AND TRADEMARK OFFICE
CERTIFICATE OF CORRECTION

PATENT NO. : 10,210,278 B2  
APPLICATION NO. : 15/250247  
DATED : February 19, 2019  
INVENTOR(S) : Shibani Sanan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 192 days.

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*